Patented Aug. 3, 1937

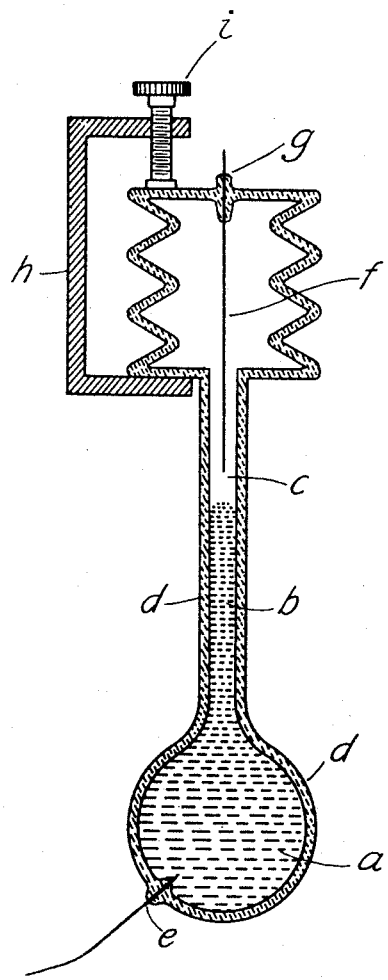

2,088,918

UNITED STATES PATENT OFFICE 2,088,918

CONTROL TYPE THERMOSTAT

Wilhelm Moser, Berlin, Germany, assignor to Telefunken Gesellschaft für Drahtlose Telegraphie m. b. H., Berlin, Germany, a corporation of Germany Application December 21, 1934, Serial No. 758,588
In Germany December 28, 1933

9 Claims. (Cl. 200—141)

This invention relates to a contact-type thermometer which is particularly adapted for use with thermostats.

For a number of practical purposes it is important that the temperature inside a closed space should be kept at a constant value. Particularly in the construction of oscillation or wave generators which are to possess a constant or stable frequency it is necessary to confine the wave generators or at least the parts thereof governing the frequency (electric oscillation circuits, tuning forks, quartz crystals, and the like) inside spaces in which a constant temperature prevails.

Spaces having a stable temperature are created in the form of thermostats in that a temperature-dependent device alternately raises and lowers the heat-yielding effect of a heating element or heat source. More particularly speaking, if a current-supplied heater resistance is used as such a source, then the temperature-dependent regulator arrangement may consist of a contact thermometer which serves to connect or disconnect the current flowing through the heater winding at the critical temperature.

If there is a demand for varying the critical temperature itself a certain amount, then mercury thermometers of the form heretofore used in technical work are not suited inasmuch as the contacts fixedly sealed in the glass wall do not allow of a variation of the contact temperature. The so-called bimetal thermometers allow of an easy variation of the contact temperature, though they suffer from uncontrollable deformation and warping, and this is liable to lead to harmful fluctuations of the contact temperature. Mercury thermometers are free from this drawback, and there is only the demand to render the contact temperature variable from the outside in a thermometer of the mercury type.

According to this invention, the problem is solved by the use of a mercury contact thermometer having a part of the glass wall supporting the second electrode made capable of being bent by a special form of construction so that the position thereof in relation to the mercury thermometer and thus the contact temperature may be varied from the outside.

The drawing shows an exemplified embodiment of the idea. The mercury thermometer comprising the main mercury space or bulb $a$ and the capillary tube $b$ and the top space $c$ being either filled with or devoid of air is enclosed in the glass wall $d$. The first electrode $e$ is brought through the lower part of the glass wall which is constantly in contact with the mercury. The second electrode $f$ is in the form of a metallic filament which at the top end of the space free from mercury is brought to the outside through a seal $g$ and which at the other end protrudes into the space free from mercury. By the distance between the end of the filament and the crest of the mercury is governed the contact temperature. According to this invention, the upper part of the glass vessel is arranged so as to be capable of deformation. In the case here shown, the flexible portion is indicated by means of the corrugations in the glass wall. By the ferrule or vise $h$ comprising the adjusting screw $i$ the said deformable part of the glass wall may be more or less compressed, with the result that the metallic filament $f$ is more or less approached to the crest of the mercury column, in other words, the contact temperature may be more or less altered.

I claim:

1. A thermostat of a contact thermometer type comprising a vessel having a bulb portion, a tube portion and a flexible portion, a liquid within said bulb and tube portions, a contact member located within said bulb portion, a second contact member located within said flexible portion, and external means for adjusting the distance between said first and second contact members by applying pressure directly to the outside of said flexible portion.

2. A thermostat of a contact thermometer type comprising a vessel having a bulb portion, a tube portion and a corrugated portion, an expansible liquid within said bulb and tube portions, a contact member located within said bulb portion, a second contact member located within said corrugated portion, and external means for adjusting the distance between said first and second contact members by applying pressure directly to the outside of said corrugated portion.

3. A thermostat of a contact thermometer type comprising a glass vessel having a bulb portion, a tube portion and a corrugated portion, a predetermined quantity of mercury within said bulb and tube portions, a contact member located within said bulb portion, a second contact member located within said corrugated portion, and means applied directly to said glass vessel for adjusting the distance between said first and second contact members.

4. A thermostat of a contact thermometer type comprising a vessel having a bulb portion, a tube portion and a corrugated portion, a liquid within said bulb and tube portions, a contact member located within said bulb portion, a second contact member located within said corrugated portion, and means applied directly to said vessel for adjusting the distance between said first and second contact members.

5. A thermostat of a contact thermometer type comprising a glass vessel having a bulb portion, a tube portion and a corrugated portion, a liquid within said bulb and tube portions, a contact member located within said bulb portion, a second contact member located within said corrugated portion, and a vise-like member surrounding said corrugated portion for adjusting the distance between said first and second contact members.

6. A thermostat of a contact thermometer type comprising a glass vessel having a bulb portion, a tube portion and a corrugated portion, a liquid within said bulb and tube portions, a contact member located within said bulb portion, a second contact member located within said corrugated portion, and a vise-like member surrounding said corrugated portion having threaded means applied directly to said glass vessel for adjusting the distance between said first and second contact members.

7. A thermostat of a contact thermometer type comprising an insulating vessel having a bulb portion, a tube portion and a corrugated portion, a predetermined quantity of mercury within said bulb and tube portions, a contact member located within said bulb portion, a second contact member located within said corrugated portion, and means applied directly to said insulating vessel for adjusting the distance between said first and second contact members.

8. A thermostat of a contact thermometer type comprising a glass vessel having a bulb portion, a tube portion, and a flexible portion, a liquid within said bulb and tube portions, a contact member located within said bulb portion, a second contact member located within said flexible portion, a vise-like member adjacent said flexible portion, said vise-like member having an adjustable screw for moving directly said flexible portion to vary the distance between said first and second contact members.

9. A thermostat of a contact thermometer type comprising a glass vessel having a bulb portion, a tube portion, and a flexible portion, a quantity of mercury within said bulb and tube portions, a contact member located within said bulb portion, a second contact member located within said flexible portion, a vise-like member adjacent said flexible portion, said vise-like member having an adjustable screw for moving directly said flexible portion to vary the distance between said first and second contact members.

WILHELM MOSER.